(12) United States Patent  
Ishimasa et al.

(10) Patent No.: US 9,297,670 B2  
(45) Date of Patent: Mar. 29, 2016

(54) STEERING ANGLE SENSOR

(75) Inventors: Takeshi Ishimasa, Kanagawa (JP); Masaya Eto, Kanagawa (JP); Yuya Ichikawa, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 128 days.

(21) Appl. No.: 14/240,071

(22) PCT Filed: Jul. 10, 2012

(86) PCT No.: PCT/JP2012/067597  
§ 371 (c)(1),  
(2), (4) Date: Feb. 21, 2014

(87) PCT Pub. No.: WO2013/027506  
PCT Pub. Date: Feb. 28, 2013

(65) Prior Publication Data  
US 2014/0210457 A1    Jul. 31, 2014

(30) Foreign Application Priority Data  
Aug. 22, 2011 (JP) ................. 2011-180599

(51) Int. Cl.  
*G01B 7/30* (2006.01)  
*G01D 5/12* (2006.01)  
*B62D 15/02* (2006.01)  
*G01D 5/04* (2006.01)  
(Continued)

(52) U.S. Cl.  
CPC .. *G01D 5/12* (2013.01); *B62D 1/16* (2013.01); *B62D 15/0215* (2013.01); *G01B 7/30* (2013.01); *G01D 5/04* (2013.01); *G01D 5/145* (2013.01)

(58) Field of Classification Search  
CPC ........... G01D 5/145; G01D 5/04; G01B 7/30; G01B 5/24  
USPC ...................................... 324/207.25  
See application file for complete search history.

(56) References Cited

U.S. PATENT DOCUMENTS 6,804,888 B2 * 10/2004 Nishikawa et al. ........... 33/1 PT  
6,909,282 B2 *  6/2005 Onishi et al. ............. 324/207.25  
(Continued)

FOREIGN PATENT DOCUMENTS

JP        57161654       10/1982  
JP       2003294409      10/2003  
(Continued)

OTHER PUBLICATIONS

International Search Report for Application No. PCT/JP2012/067597 dated Aug. 7, 2012 (English Translation, 2 pages).

*Primary Examiner* — Reena Aurora  
(74) *Attorney, Agent, or Firm* — Michael Best & Friedrich LLP

(57) ABSTRACT

A steering angle sensor comprising an annular drive gear, which rotates in accompaniment with rotation of a steering wheel, and further comprising a first driven gear and a second driven gear, which have magnets disposed therein and rotate in a driven manner in accordance with rotation of the annular drive gear, the steering angle sensor generating angle-of-rotation information of the steering wheel utilizing changes in magnetic fields based on rotation of the first driven gear and the second driven gear, wherein an intermediate gear that meshes with the annular drive gear, the first driven gear, and the second driven gear is interposed between the annular drive gear and the first driven gear and the second driven gear.

18 Claims, 7 Drawing Sheets

(51) Int. Cl.
  *B62D 1/16* (2006.01)
  *G01D 5/14* (2006.01)

(56) References Cited

U.S. PATENT DOCUMENTS

| | | | |
|---|---|---|---|
| 7,841,231 B2 * | 11/2010 | Kang et al. | 73/117.02 |
| 8,570,031 B2 * | 10/2013 | Ruebenhagen et al. | 324/207.25 |
| 2008/0018329 A1 | 1/2008 | Shiraga et al. | |
| 2008/0307873 A1 | 12/2008 | Kang et al. | |

FOREIGN PATENT DOCUMENTS

| | | | |
|---|---|---|---|
| JP | 2004125594 | | 4/2004 |
| JP | 2005156163 | | 6/2005 |
| JP | 2006119082 | | 5/2006 |
| JP | 2006182054 | | 7/2006 |
| JP | 3860399 | * | 9/2006 |
| JP | 2009505097 | | 2/2009 |
| JP | 2011099727 | | 5/2011 |
| WO | 2007107649 | | 9/2007 |
| WO | 2012025703 | | 3/2012 |

* cited by examiner (a)

(b)

(a)

(b)

STEERING ANGLE SENSOR

BACKGROUND OF THE INVENTION

The present invention relates to a steering angle sensor for generating angle-of-rotation information of a steering wheel of an automobile.

Conventionally, steering angle sensors for generating angle-of-rotation information of a steering wheel of an automobile have been known.

FIG. 7 shows an exploded view of a conventional steering angle sensor 100. The steering angle sensor 100 is equipped with an annular drive gear 101, which rotates in accompaniment with the rotation of a non-illustrated steering wheel, and a first driven gear 103 and a second driven gear 105, which mesh with the annular drive gear 101 and rotate in a driven manner.

Magnets 104 and 106 are integrally disposed in the first driven gear 103 and the second driven gear 105, respectively. A circuit board 110 is disposed in the steering angle sensor 100, and elements 111 and 113 that detect changes in magnetic fields based on the rotation of the magnets 104 and 106 are mounted on the circuit board 110 (e.g., see JP-A-2003-294409).

SUMMARY OF INVENTION

In the conventional steering angle sensor 100, the annular drive gear 101 is molded using a resin material. Further, there are many cases where the steering angle sensor 100 has a complex shape; for example, the central portion of the steering angle sensor 100 has a large opening for inserting a steering shaft through the steering angle sensor 100, and engagement portions 101a for transmitting the rotational driving of the steering shaft are disposed in the steering angle sensor 100. In conjunction with the annular drive gear 101 having such a structure, ensuring that the roundness of the annular drive gear 101 is extremely high is difficult in terms of molding characteristics such as sink marks and shrinkage of the resin.

The first driven gear 103 and the second driven gear 105 mesh with the annular drive gear 101 at different positions, so errors in the angles of rotation arising in the first driven gear 103 and the second driven gear 105 because of the roundness of the annular drive gear 101 are respectively different. Consequently, there has been the concern that error in the absolute angle of the annular drive gear 101 computed on the basis of the rotation of the first driven gear 103 and the second driven gear 105 will become greater than mechanical errors caused by backlash of the gears.

As a result of considering this problem, the inventors of the present invention discovered that this problem can be solved by interposing, between the annular drive gear and the first driven gear and the second driven gear, an intermediate gear that meshes with these gears.

That is, it is an object of the present invention to provide a steering angle sensor in which the effect of errors in the angles of rotation arising in the first driven gear and the second driven gear because of the roundness of the annular drive gear is reduced and which can generate angle-of-rotation information of the steering wheel with good precision.

According to the present invention, there is provided a steering angle sensor equipped with an annular drive gear, which rotates in accompaniment with the rotation of a steering wheel, and a first driven gear and a second driven gear, which have magnets disposed in them and rotate in a driven manner in accordance with the rotation of the annular drive gear, the steering angle sensor being for generating angle-of-rotation information of the steering wheel utilizing changes in magnetic fields based on the rotation of the first driven gear and the second driven gear, wherein an intermediate gear that meshes with the annular drive gear, the first driven gear, and the second driven gear is interposed between the annular drive gear and the first driven gear and the second driven gear; and thus the above problem can be solved.

That is, in the steering angle sensor of the present invention, the intermediate gear that meshes with the annular drive gear, the first driven gear, and the second driven gear is interposed between the annular drive gear and the first driven gear and the second driven gear, so the effect that the roundness of the annular drive gear directly has on the angles of rotation of the first driven gear and the second driven gear can be reduced. Specifically, in contrast to the annular drive gear through which the steering shaft is inserted, it is not necessary to dispose a large opening in the intermediate gear or dispose engagement portions for transmitting drive on the intermediate gear. For that reason, the intermediate gear can be molded with a higher roundness than the annular drive gear.

Consequently, even in a case where the roundness of the annular drive gear is low, the lowness of the roundness of the annular drive gear can be absorbed by the intermediate gear. As a result, error in the angle-of-rotation information output from the steering angle sensor can be reduced.

Further, in the steering angle sensor of the present invention, it is preferred that the diameter of the intermediate gear be smaller than the diameter of the annular drive gear. By configuring the intermediate gear in this way, the roundness of the intermediate gear can easily be made higher than the roundness of the annular drive gear.

Further, in the steering angle sensor of the present invention, it is preferred that the intermediate gear have first tooth portions that mesh with the annular drive gear and second tooth portions that mesh with the first driven gear and the second driven gear and that the number of the first tooth portions and the number of the second tooth portions be equal. By configuring the intermediate gear in this way, the rotational speed of the annular drive gear is no longer accelerated or decelerated, and the angle-of-rotation information of the steering wheel can be generated with good precision without changing the content of angle-of-rotation computation processing between a case where the intermediate gear is interposed and a case where the intermediate gear is not interposed.

Further, in the steering angle sensor of the present invention, it is preferred that the annular drive gear, the intermediate gear, the first driven gear, and the second driven gear be placed in such a way that the axial direction of the rotational axes of the intermediate gear, the first driven gear, and the second driven gear intersects the axial direction of the rotational axis of the annular drive gear. By placing the gears in this way, the steering angle sensor can be miniaturized.

Further, in the steering angle sensor of the present invention, it is preferred that the first driven gear and the second driven gear be rotatably supported in a housing of the steering angle sensor and that the intermediate gear be rotatably supported on the annular drive gear, the first driven gear, and the second driven gear regardless of the housing. By rotatably supporting the intermediate gear in this way, the structure of the intermediate gear can be simplified, and an intermediate gear having a higher roundness can be molded. Further, by adjusting the positions of the axes of the first driven gear and the second driven gear, all the gears can be accurately caused to mesh.

Further, in the steering angle sensor of the present invention, it is preferred that the intermediate gear be made of resin and be formed as a thick member having no hole disposed therein. By configuring the intermediate gear in this way, a drop in roundness caused by sink marks and shrinkage of the resin can be suppressed, and an intermediate gear having a high roundness can be molded.

Further, in the steering angle sensor of the present invention, it is preferred that the intermediate gear be made of a metal material. By configuring the intermediate gear in this way, an intermediate gear having a high roundness can be molded.

DETAILED DESCRIPTION

Figure 1:
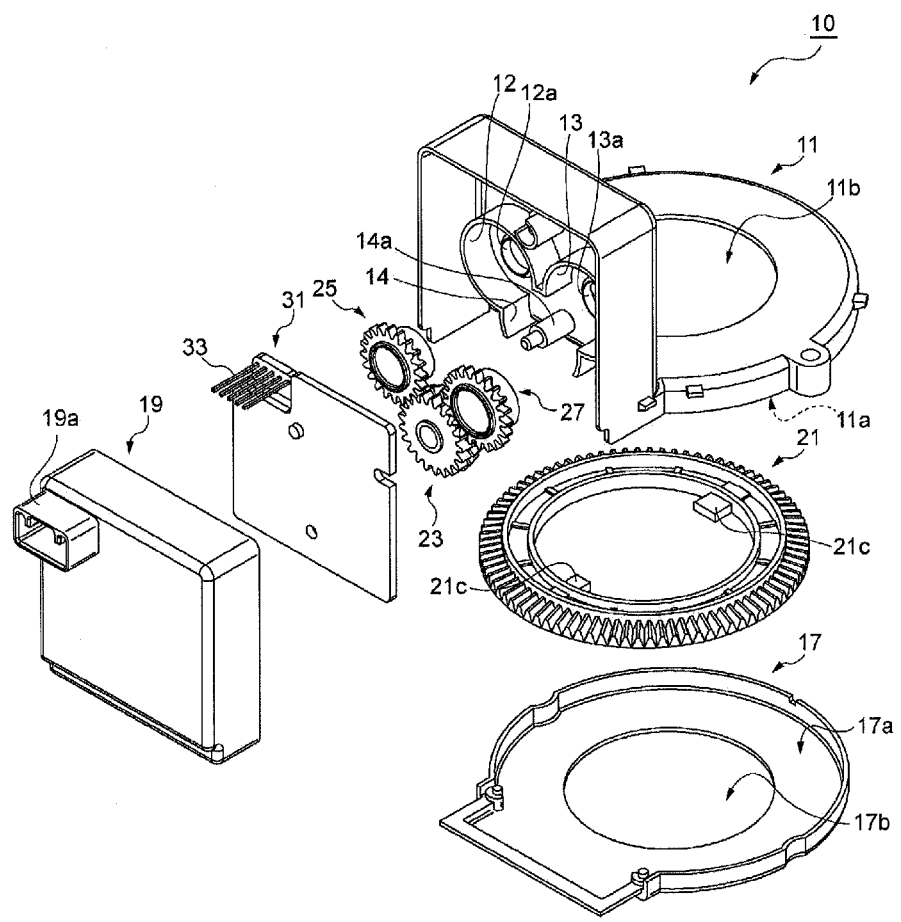
FIG. 1 is an exploded perspective view for describing the overall configuration of a steering angle sensor pertaining to a first embodiment of the present invention.

Embodiments relating to a steering angle sensor pertaining to the present invention will be specifically described below on the basis of the drawings.

Constituent elements denoted by the same reference signs in the drawings represent the same constituent elements unless otherwise indicated, and description thereof will be omitted as appropriate.

Figure 2:
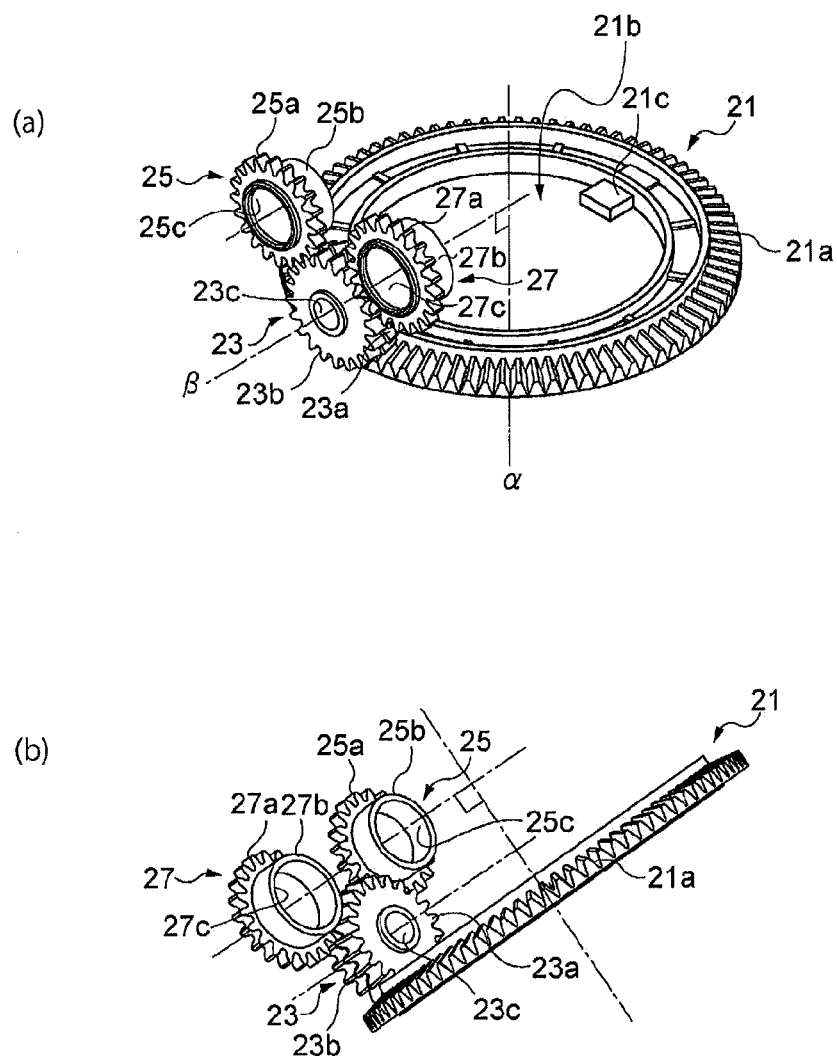
FIG. 2 illustrates perspective views showing a state in which an annular drive gear, an intermediate gear, a first driven gear, and a second driven gear of the first embodiment are meshed.
Figure 3:
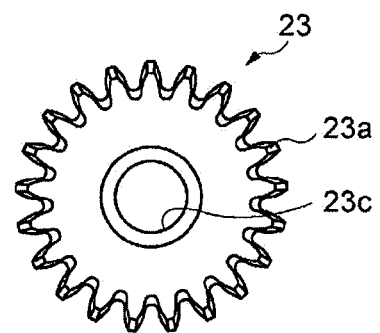
FIG. 3 illustrates a front view and a side view of the intermediate gear of the first embodiment.
Figure 3:
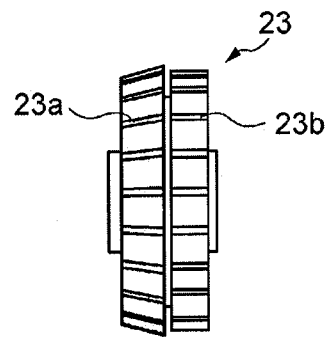

FIG. 1 is an exploded perspective view for describing the overall configuration of a steering angle sensor 10 pertaining to a first embodiment. FIGS. 2(a) and 2(b) illustrate perspective views showing a state in which an annular drive gear 21, an intermediate gear 23, a first driven gear 25, and a second driven gear 27 are meshed. FIGS. 3 (a) and (b) illustrate a front view and a side view for describing the configuration of the intermediate gear 23.

The steering angle sensor 10 pertaining to the first embodiment is equipped with the first driven gear 25 and the second driven gear 27, which have non-illustrated magnets disposed in them and rotate in tandem with the rotation of the annular drive gear 21, and generates angle-of-rotation information by means of the so-called vernier principle in accordance with changes in magnetic fields produced by rotation.

The steering angle sensor 10 is equipped with an upper housing 11, a lower housing 17, and a side housing 19. Through holes 11b and 17b concentric with a steering shaft are formed in the upper housing 11 and the lower housing 17, respectively. The annular drive gear 21, the intermediate gear 23, the first driven gear 25, the second driven gear 27, and a circuit board 31 are housed in a space surrounded by the upper housing 11, the lower housing 17, and the side housing 19.

A first driven gear housing portion 12 that houses the first driven gear 25, a second driven gear housing portion 13 that houses the second driven gear 27, and an intermediate gear housing portion 14 that houses the intermediate gear 23 are formed in the upper housing 11. A first bearing portion 12a that rotatably supports the first driven gear 25 is formed in the first driven gear housing portion 12. A second bearing portion 13a that rotatably supports the second driven gear 27 is formed in the second driven gear housing portion 13. A support shaft 14a that rotatably supports the intermediate gear 23 is formed in the intermediate gear housing portion 14.

The annular drive gear 21 is housed in an annular drive gear housing portion 11a of the upper housing 11 and an annular drive gear housing portion 17a of the lower housing 17 in a state in which the annular drive gear 21 is rotatably positioned therein. The annular drive gear 21 has an annular shape in which tooth portions 21a are formed on the outer peripheral portion and an open portion 21b is formed in the center. Further, engagement portions 21c for engaging with the steering shaft and transmitting the rotation of the steering shaft to the annular drive gear 21 are formed on the inner peripheral surface of the annular drive gear 21 surrounding the open portion 21b, whereby the annular drive gear 21 is driven to rotate in accompaniment with the rotation of the steering shaft.

The tooth portions 21a of the annular drive gear 21 are formed on the outer peripheral side of the open portion 21b, extend radially from the center of the rotational axis, and have shapes whose height becomes lower (whose thickness becomes thinner) away from the center of the rotational axis.

The first driven gear 25 is housed in the first driven gear housing portion 12 formed in the upper housing 11 in a state in which the first driven gear 25 is engaged with the intermediate gear 23 so as to be capable of transmitting rotation and is rotatably positioned. Tooth portions 25a are formed on the outer peripheral portion of the first driven gear 25, and an open portion 25c is formed in the center of the first driven gear 25. Further, an engagement portion 25b is formed adjacent to the open portion 25c, and the engagement portion 25b engages with the first bearing portion 12a of the upper housing 11, whereby the first driven gear 25 is rotatably supported on the first bearing portion 12a.

The second driven gear 27 is housed in the second driven gear housing portion 13 formed in the upper housing 11 in a state in which the second driven gear 27 is engaged with the intermediate gear 23 so as to be capable of transmitting rotation and is rotatably positioned. Tooth portions 27a are formed on the outer peripheral portion of the second driven gear 27, and an open portion 27c is formed in the center of the second driven gear 27. Further, an engagement portion 27b is formed adjacent to the open portion 27c, and the engagement portion 27b engages with the second bearing portion 13a of the upper housing 11, whereby the second driven gear 27 is rotatably supported on the second bearing portion 13a.

Non-illustrated magnets are integrally disposed in the first driven gear 25 and the second driven gear 27. The first driven gear 25 and the second driven gear 27 are placed in such a way that the directions of the magnetic fluxes formed by the magnets have a predetermined phase difference. Further, in the steering angle sensor 10 pertaining to the first embodiment, the number of the tooth portions 25a on the first driven gear 25 and the number of the tooth portions 27a on the second driven gear 27 are different, and angle-of-rotation information corresponding to the angle of rotation of the steering shaft is generated.

The intermediate gear 23 is housed in the intermediate gear housing portion 14 formed in the upper housing 11 in a state in which the intermediate gear 23 is engaged with the first driven gear 25 and the second driven gear 27 so as to be capable of transmitting rotation and is rotatably positioned. A bearing hole 23c is formed in the center of the intermediate gear 23, and the support shaft 14a formed in the upper housing 11 is inserted into the bearing hole 23c, whereby the intermediate gear 23 is rotatably supported on the support shaft 14a.

Further, first tooth portions 23a that engage with the annular drive gear 21 and second tooth portions 23b that engage with the first driven gear 25 and the second driven gear 27 are formed on the intermediate gear 23. The first tooth portions 23a and the second tooth portions 23b are formed in the same number and are placed on straight lines along the axial direction in such a way that, in a case where the intermediate gear 23 is seen from the front (the state in FIG. 3(a)), the teeth of the first tooth portions 23a and the second tooth portions 23b lie on top of one another. Further, the first tooth portions 23a have tapered shapes that become smaller in diameter away from the second tooth portions 23b (see FIG. 3 (b)).

The intermediate gear 23 does not have a hole other than the bearing hole 23c whose diameter is relatively small, and it is also not necessary to dispose on the intermediate gear 23 engagement portions other than the tooth portions 23a. Further, the intermediate gear 23 has a small diameter compared to the annular drive gear 21, and the teeth of the first tooth portions 23a and the second tooth portions 23b are placed on straight lines along the axial direction and have radially symmetrical shapes as seen from the center of the rotational axis—that is, they are point-symmetrical about the rotational axis. For that reason, even in the case of die-molding the intermediate gear 23 using a resin material, sink marks and shrinkage occur uniformly, strain and so forth at the time of molding does not easily arise compared to the annular drive gear 21, and a drop in roundness can be suppressed.

The method of molding the intermediate gear 23 is not limited to die molding using a resin material. A high roundness can be obtained no matter what kind of molding method is used, because the intermediate gear 23 is point-symmetrical about the rotational axis. Particularly in the case of the intermediate gear 23 whose diameter is relatively small, a relatively high roundness can be obtained regardless of the raw material. Further, with a metal material, sink marks and shrinkage at the time of molding do not easily arise compared to a resin material, so a high roundness can also be obtained by die molding or process molding using a metal material.

Further, in the steering angle sensor 10 pertaining to the first embodiment, in order to miniaturize the sensor, the intermediate gear 23, the first driven gear 25, and the second driven gear 27 are placed in such a way that an axial direction of the rotational axis of the intermediate gear 23, the first driven gear 25, and the second driven gear 27 intersects an axial direction a of the rotational axis of the annular drive gear 21. In the example in FIGS. 2(a) and 2(b), an angle 8 formed by the axial direction of the rotational axis of the intermediate gear 23, the first driven gear 25, and the second driven gear 27 and the axial direction a of the rotational axis of the annular drive gear 21 is configured to be 90 degrees. Of the first tooth portions 23a and the second tooth portions 23b of the intermediate gear 23, the first tooth portions 23a positioned on the side of the open portion 21b in the center of the annular drive gear 21 mesh with the tooth portions 21a of the annular drive gear 21 and receive the rotation of the annular drive gear 21. On the other hand, the second tooth portions 23b of the intermediate gear 23 mesh with the tooth portions 25a of the first driven gear 25 and the tooth portions 27a of the second driven gear 27 and transmit rotation to the first driven gear 25 and the second driven gear 27.

At this time, because the height of the tooth portions 21a of the annular drive gear 21 becomes lower away from the center of the rotational axis and the first tooth portions 23a of the intermediate gear 23 gradually become smaller in diameter in the direction toward the center of the rotational axis of the annular drive gear 21, the intermediate gear 23 is sandwiched between and held by the annular drive gear 21, the first driven gear 25, and the second driven gear 27 and does not easily move in the axial direction.

Further, because the number of the first tooth portions 23a and the number of the second tooth portions 23b of the intermediate gear 23 are configured in the same number, the number of teeth with which the intermediate gear 23 receives rotation from the annular drive gear 21 and the number of teeth with which the intermediate gear 23 transmits rotation to the first driven gear 25 and the second driven gear 27 become the same, so that rotational acceleration and deceleration does not occur. For that reason, it is not necessary to change the content of computational processing when processing the signal output from the steering angle sensor 10 and detecting the angle of rotation of the steering wheel between a case where the intermediate gear 23 is interposed and a case where the intermediate gear 23 is not interposed.

Non-illustrated elements that convert changes in the magnetic fields produced by the rotation of the first driven gear 25 and the second driven gear 27 into electrical signals and output the electrical signals are mounted on the circuit board 31. The elements generate the electrical signals as angle-of-rotation information in accordance with the angle of rotation of the steering shaft. Further, connector pins 33 disposed on the circuit board 31 are fitted together with a connector portion 19a disposed on the side housing 19, and the connector portion 19a is electrically connected to the circuit board 31.

In this way, in the steering angle sensor 10 pertaining to the first embodiment, the intermediate gear 23 that has a relatively high roundness is interposed between the first driven gear 25 and the second driven gear 27, so even in a case where the roundness of the annular drive gear 21 disposed with the open portion 21b and the engagement portions 21c is low, error in the angle of rotation transmitted from the annular drive gear 21 to the first driven gear 25 and the second driven gear 27 can be reduced.

In particular, in the steering angle sensor 10 pertaining to the first embodiment, the intermediate gear 23 is formed as a thick member that is smaller in diameter than the annular drive gear 21 and in which the first tooth portions 23a and the second tooth portions 23b are placed on straight lines along the axial direction, so moderate strength is obtained. Consequently, a drop in roundness is further suppressed, and the angle-of-rotation information of the steering shaft can be generated with good precision.

Further, the steering angle sensor 10 pertaining to the first embodiment is configured in such a way that the axial direction a of the rotational axis of the annular drive gear 21 and the axial direction of the rotational axes of the intermediate gear 23, the first drive gear 25, and the second drive gear 27 form a 90-degree angle. For that reason, the steering angle sensor 10 can be miniaturized compared to a case where the rotational directions of the rotational axes of the annular drive gear 21, the intermediate gear 23, the first driven gear 25, and the second driven gear 27 are parallel—that is, a case where the annular drive gear 21, the intermediate gear 23, the first driven gear 25, and the second driven gear 27 are all placed along the same plane.

Further, the steering angle sensor 10 pertaining to the first embodiment has a structure in which the intermediate gear 23 is sandwiched between and held by the annular drive gear 21, the first driven gear 25, and the second driven gear 27 and is therefore fixed, so the position of the intermediate gear 23 does not easily shift in the direction of the rotational axis. Consequently, the concern that the rotation of the annular drive gear 21 will be erroneously transmitted to the first driven gear 25 and the second driven gear 27 is reduced, and error in the angle-of-rotation information that is generated can be further reduced.

A steering angle sensor pertaining to a second embodiment of the present invention differs from the steering angle sensor pertaining to the first embodiment in terms of the configurations of the intermediate gear and the upper housing.

Figure 4:
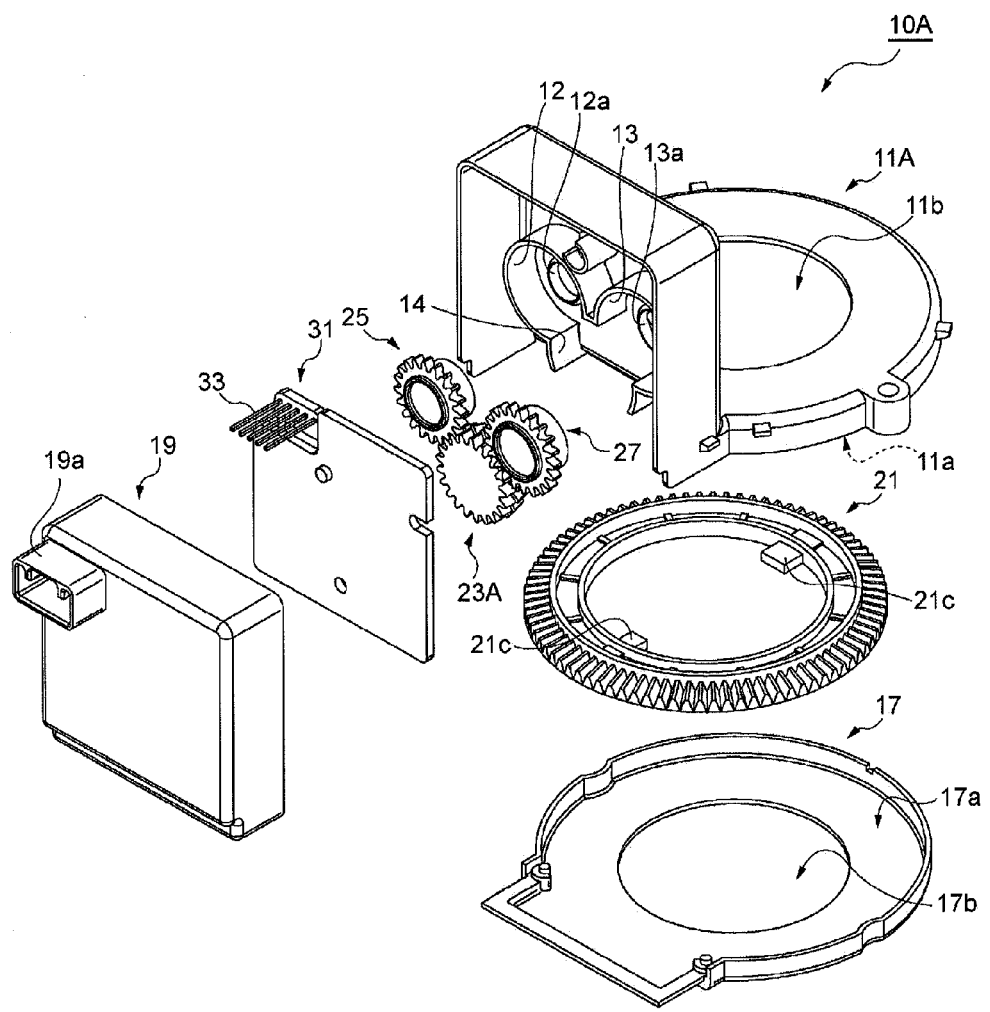
FIG. 4 is an exploded perspective view for describing the overall configuration of a steering angle sensor pertaining to a second embodiment of the present invention.
Figure 5:
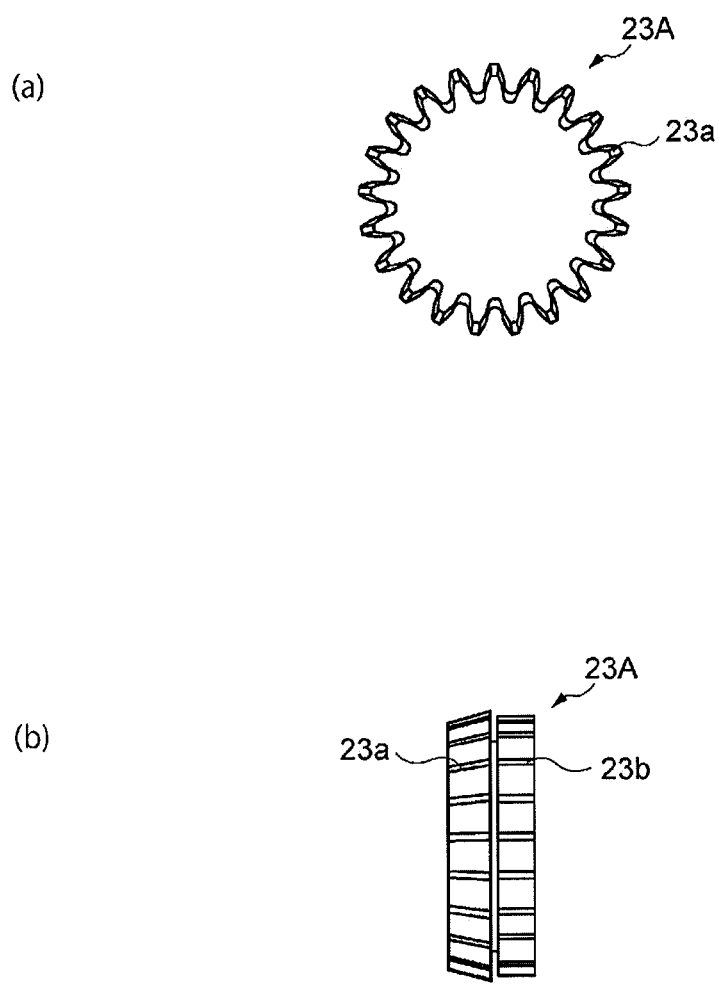
FIG. 5 illustrates a front view and a side view of an intermediate gear of the second embodiment.
Figure 6:
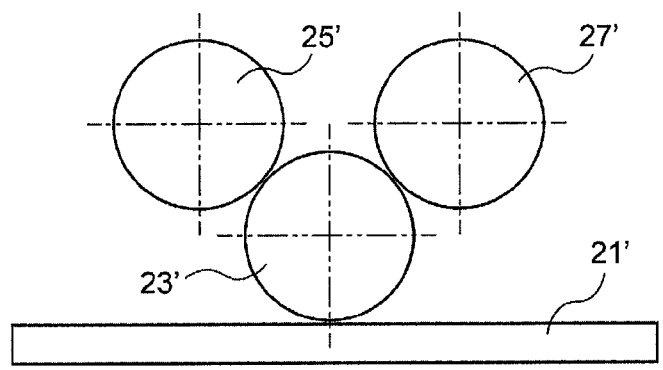
FIG. 6 illustrates drawings for describing alignment between the annular drive gear, the intermediate gear, the first driven gear, and the second driven gear.
Figure 6:
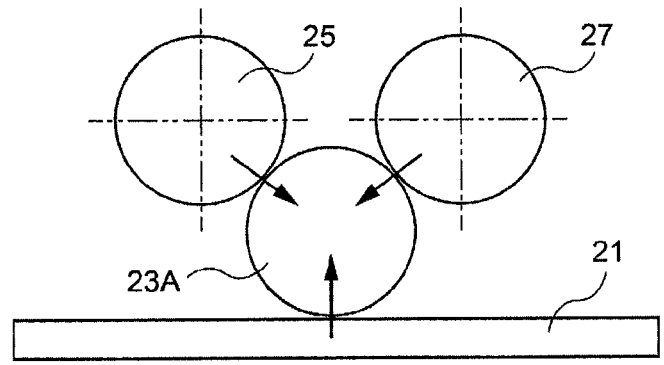
Figure 7:
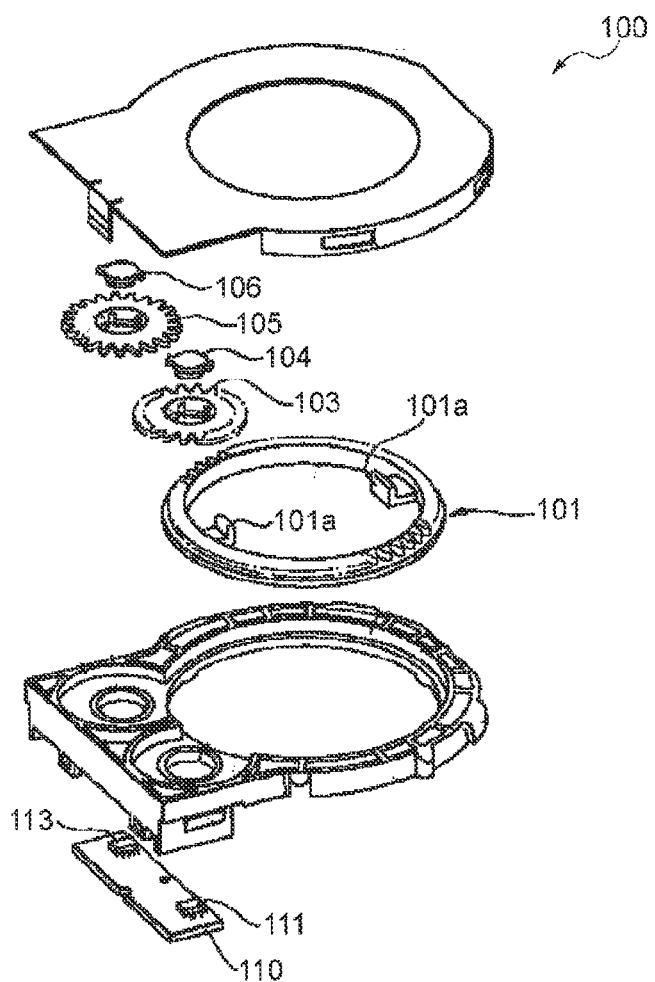
FIG. 7 is an exploded view for describing the configuration of a conventional steering angle sensor.

FIG. 4 is an exploded perspective view for describing the overall configuration of a steering angle sensor 10A pertaining to the second embodiment. FIGS. 5(a) and (b) illustrate a front view and a side view for describing the configuration of an intermediate gear 23A. FIG. 6 illustrates drawings for describing alignment between the annular drive gear 21, the intermediate gear 23A, the first driven gear 25, and the second driven gear 27.

The steering angle sensor 10A pertaining to the second embodiment differs from the steering angle sensor 10 pertaining to the first embodiment in that the intermediate gear 23A is formed as a thick member having no shaft insertion hole disposed therein. Further, in accompaniment with this, an upper housing 11A has no support shaft in the intermediate gear housing portion 14. With this intermediate gear 23A, the structure of the intermediate gear 23A can be simplified and the roundness can be further raised.

Moreover, in the case of a configuration where a shaft insertion hole is formed in the intermediate gear and the intermediate gear is supported on a support shaft in the upper housing, it is necessary to form the gears and the upper housing in such a way that the precision of the positions of the axes in the three locations of an intermediate gear 23', a first driven gear 25', and a second driven gear 27' is ensured as shown in FIG. 6(a) in order to align the meshing (pitch) between the gears. In contrast, in a case where the shaft insertion hole in the intermediate gear is omitted, the intermediate gear 23A can be accurately caused to mesh with all three of the annular drive gear 21, the first driven gear 25, and the second driven gear 27 by adjusting the positions of the axes in the two locations of the first driven gear 25 and the second driven gear 27 as shown in FIG. 6(b).

Consequently, according to the steering angle sensor 10A pertaining to the second embodiment, effects that are the same as those of the steering angle sensor 10 pertaining to the first embodiment can be obtained, and error that occurs when transmitting the angle of rotation of the annular drive gear 21 to the first driven gear 25 and the second driven gear 27 can be further reduced.

The steering angle sensors 10 pertaining to the first and second embodiments described above represent one aspect of the present invention and are not intended to limit the invention, and each of the embodiments can be arbitrarily changed in the scope of the present invention. The steering angle sensors 10 and 10A pertaining to the first and second embodiments can be changed as follows, for example.

(1) In the steering angle sensors 10 pertaining to the first and second embodiments, the axial direction a of the rotational axis of the annular drive gear 21 and the axial direction of the rotational axes of the intermediate gear 23, the first driven gear 25, and the second driven gear 27 are configured to form a 90-degree angle, but the angle formed by these axial directions may be less than 90° or may exceed 90°. Regardless of the angle, error in the angle-of-rotation information caused by the roundness of the annular drive gear 21 can be reduced.

(2) In the steering angle sensors 10 pertaining to the first and second embodiments, the diameter of the intermediate gear 23 is smaller than the diameters of the first driven gear 25 and the second driven gear 27, but the size of the intermediate gear 23 is not particularly limited. For example, as long as the roundness of the intermediate gear 23 is formed so as to be high, the diameter of the intermediate gear 23 may even be larger than the diameter of the annular drive gear 21.

(3) In the steering angle sensors 10 pertaining to the first and second embodiments, the first tooth portions 23a of the intermediate gear 23 that mesh with the tooth portions 21a of the annular drive gear 21 and the second tooth portions 23b of the intermediate gear 23 that mesh with the first driven gear 25 and the second driven gear 27 are independently disposed and placed on straight lines along the axial direction, but the intermediate gear 23 may be configured in such a way that the annular drive gear 21, the first driven gear 25, and the second driven gear 27 all mesh with common tooth portions.

The invention claimed is:

1. A steering angle sensor comprising an annular drive gear, which rotates in accompaniment with rotation of a steering wheel, and further comprising a first driven gear and a second driven gear, which have magnets disposed therein and rotate in a driven manner in accordance with rotation of the annular drive gear, the steering angle sensor being for generating angle-of-rotation information of the steering wheel utilizing changes in magnetic fields based on rotation of the first driven gear and the second driven gear, wherein an intermediate gear that meshes with the annular drive gear, the first driven gear, and the second driven gear is interposed between the annular drive gear and the first driven gear and the second driven gear, and wherein the intermediate gear has first tooth portions that mesh with the annular drive gear and second tooth portions that mesh with the first driven gear and the second driven gear, and a number of the first tooth portions and a number of the second tooth portions are equal.

2. The steering angle sensor according to claim 1, wherein a diameter of the intermediate gear is smaller than the diameter of the annular drive gear.

3. The steering angle sensor according to claim 2, wherein the annular drive gear, the intermediate gear, the first driven gear, and the second driven gear are placed in such a way that an axial direction of rotational axes of the intermediate gear, the first driven gear, and the second driven gear intersects an axial direction of rotational axis of the annular drive gear.

4. The steering angle sensor according to claim 3, wherein the first driven gear and the second driven gear are rotatably supported in a housing of the steering angle sensor, and the intermediate gear is rotatably supported on the annular drive gear, the first driven gear, and the second driven gear regardless of the housing.

5. The steering angle sensor according to claim 4, wherein the intermediate gear is made of resin and is formed as a thick member having no hole disposed therein.

6. The steering angle sensor according to claim 4, wherein the intermediate gear is made of a metal material.

7. The steering angle sensor according to claim 4, wherein the intermediate gear is made of resin and is formed as a thick member having no hole disposed therein.

8. The steering angle sensor according to claim 4, wherein the intermediate gear is made of a metal material.

9. The steering angle sensor according to claim 1, wherein the annular drive gear, the intermediate gear, the first driven gear, and the second driven gear are placed in such a way that an axial direction of rotational axes of the intermediate gear, the first driven gear, and the second driven gear intersects an axial direction of rotational axis of the annular drive gear.

10. The steering angle sensor according to claim 1, wherein the first driven gear and the second driven gear are rotatably supported in a housing of the steering angle sensor, and the intermediate gear is rotatably supported on the annular drive gear, the first driven gear, and the second driven gear regardless of the housing.

11. The steering angle sensor according to claim 1, wherein the intermediate gear is made of resin and is formed as a thick member having no hole disposed therein.

12. The steering angle sensor according to claim 1, wherein the intermediate gear is made of a metal material.

13. A steering angle sensor comprising an annular drive gear, which rotates in accompaniment with rotation of a steering wheel, and further comprising a first driven gear and a second driven gear, which have magnets disposed therein and rotate in a driven manner in accordance with rotation of the annular drive gear, the steering angle sensor being for generating angle-of-rotation information of the steering wheel utilizing changes in magnetic fields based on rotation of the first driven gear and the second driven gear, wherein an intermediate gear that meshes with the annular drive gear, the first driven gear, and the second driven gear is interposed between the annular drive gear and the first driven gear and the second driven gear, and wherein the annular drive gear, the intermediate gear, the first driven gear, and the second driven gear are placed in such a way that an axial direction of rotational axes of the intermediate gear, the first driven gear, and the second driven gear intersects an axial direction of rotational axis of the annular drive gear.

14. The steering angle sensor according to claim 13, wherein a diameter of the intermediate gear is smaller than the diameter of the annular drive gear.

15. The steering angle sensor according to claim 14, wherein the first driven gear and the second driven gear are rotatably supported in a housing of the steering angle sensor, and the intermediate gear is rotatably supported on the annular drive gear, the first driven gear, and the second driven gear regardless of the housing.

16. The steering angle sensor according to claim 13, wherein the first driven gear and the second driven gear are rotatably supported in a housing of the steering angle sensor, and the intermediate gear is rotatably supported on the annular drive gear, the first driven gear, and the second driven gear regardless of the housing.

17. The steering angle sensor according to claim 13, wherein the intermediate gear is made of resin and is formed as a thick member having no hole disposed therein.

18. The steering angle sensor according to claim 13, wherein the intermediate gear is made of a metal material.

* * * * *